(12) United States Patent
Jeong et al.

(10) Patent No.: US 12,407,833 B2
(45) Date of Patent: *Sep. 2, 2025

(54) VIDEO ENCODING AND DECODING METHOD

(71) Applicant: INDUSTRY-UNIVERSITY COOPERATION FOUNDATION HANYANG UNIVERSITY, Seoul (KR)

(72) Inventors: Je Chang Jeong, Seoul (KR); Ki Baek Kim, Seoul (KR); Won Jin Lee, Gyeonggi-do (KR); Hye Jin Shin, Jeollanam-do (KR); Jong Sang Yoo, Seoul (KR); Jang Hyeok Yun, Seoul (KR); Kyung Jun Lee, Busan (KR); Jae Hun Kim, Seoul (KR); Sang Gu Lee, Jeollanam-do (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,559

(22) Filed: Nov. 15, 2023

(65) Prior Publication Data
US 2024/0098275 A1   Mar. 21, 2024

Related U.S. Application Data

(63) Continuation of application No. 17/945,847, filed on Sep. 15, 2022, now Pat. No. 11,856,206, which is a
(Continued)

(30) Foreign Application Priority Data

Jun. 25, 2012 (KR) .................. 10-2012-0068019
May 28, 2013 (KR) .................. 10-2013-0060060
Jun. 24, 2013 (KR) .................. 10-2013-0072111

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .... H04N 19/159; H04N 19/105; H04N 19/11; H04N 19/154; H04N 19/176;
(Continued)

(56) References Cited

U.S. PATENT DOCUMENTS 8,295,351 B2 * 10/2012 Palfner ............... H04N 19/14
375/240.12
8,619,857 B2   12/2013 Zhao et al.
(Continued)

FOREIGN PATENT DOCUMENTS

KR   10-2008-0069069 A   7/2008
KR   10-2009-0108499 A   1/2009
(Continued)

OTHER PUBLICATIONS

High Efficiency Video Coding (HEVC) text specification draft 10 (JCTVC-L1003_v34), Joint Collaborative Team on Video Coding (JCT-VC) of ITU-T SG16 WP3 and ISO/IEC JTC1/SC29/WG11 (Mar. 19, 2013).
(Continued)

*Primary Examiner* — Dominic D Saltarelli

(57) ABSTRACT

A method for decoding an image based on an intra prediction, comprising: obtaining a first prediction pixel of a first region in a current block by using a neighboring pixel
(Continued)

adjacent to the current block; obtaining a second prediction pixel of a second region in the current block by using the first prediction pixel of the first region; and decoding the current block based on the first and the second prediction pixels.

9 Claims, 13 Drawing Sheets

Related U.S. Application Data continuation of application No. 17/237,494, filed on Apr. 22, 2021, now Pat. No. 11,483,572, which is a continuation of application No. 16/662,291, filed on Oct. 24, 2019, now Pat. No. 11,051,028, which is a continuation of application No. 15/495,880, filed on Apr. 24, 2017, now Pat. No. 10,491,905, which is a continuation of application No. 14/411,088, filed as application No. PCT/KR2013/005613 on Jun. 25, 2013, now Pat. No. 9,667,965.

(51) Int. Cl.
| | | |
|---|---|---|
| *H04N 19/11* | (2014.01) | |
| *H04N 19/154* | (2014.01) | |
| *H04N 19/176* | (2014.01) | |
| *H04N 19/182* | (2014.01) | |
| *H04N 19/184* | (2014.01) | |
| *H04N 19/196* | (2014.01) | |
| *H04N 19/593* | (2014.01) | |

(52) U.S. Cl.
CPC ......... *H04N 19/154* (2014.11); *H04N 19/176* (2014.11); *H04N 19/182* (2014.11); *H04N 19/197* (2014.11); *H04N 19/593* (2014.11); *H04N 19/184* (2014.11)

(58) Field of Classification Search
CPC .. H04N 19/182; H04N 19/197; H04N 19/593; H04N 19/184
USPC .................................................. 375/240.12
See application file for complete search history.

(56) References Cited

U.S. PATENT DOCUMENTS

| | | | |
|---|---|---|---|
| 8,737,481 B2 | 5/2014 | Lee et al. | |
| 8,737,824 B1* | 5/2014 | Bultje | H04N 19/176 386/353 |
| 9,058,659 B2 | 6/2015 | Yie et al. | |
| 9,648,325 B2* | 5/2017 | Baeza | H04N 19/51 |
| 2009/0003441 A1 | 1/2009 | Sekiguchi | |
| 2011/0249739 A1 | 10/2011 | Liu et al. | |
| 2012/0140822 A1 | 6/2012 | Wang et al. | |
| 2013/0044811 A1 | 2/2013 | Kim | |
| 2013/0202030 A1 | 8/2013 | Song et al. | |
| 2013/0208794 A1 | 8/2013 | Jeong et al. | |
| 2013/0230105 A1* | 9/2013 | Song | H04N 19/593 375/240.12 |
| 2013/0251036 A1 | 9/2013 | Lee et al. | |
| 2013/0272405 A1 | 10/2013 | Jeon et al. | |
| 2014/0010295 A1 | 1/2014 | Lu et al. | |
| 2014/0092980 A1 | 4/2014 | Guo et al. | |
| 2014/0105290 A1 | 4/2014 | Kwon et al. | |
| 2014/0205008 A1 | 7/2014 | Wu | |
| 2014/0341281 A1 | 11/2014 | Bossen et al. | |
| 2017/0280157 A1 | 9/2017 | Jeon et al. | |
| 2018/0124426 A1 | 5/2018 | Jeon et al. | |

FOREIGN PATENT DOCUMENTS

| | | | |
|---|---|---|---|
| KR | 10-2012-0014947 A | 2/2012 | |
| KR | 10-2012-0043661 A | 5/2012 | |
| KR | 10-2012-0065953 A | 6/2012 | |
| KR | 10-2225881 B1 | 3/2021 | |
| WO | WO-2011127964 A2 * | 10/2011 | ............. H04N 19/11 |

OTHER PUBLICATIONS

Joint Collaborative Team on Video Coding (JCT-VC) ofITU-T SG16 WP3 and ISO/IEC JTC1/SC29/WG11 1st Meeting: Dresden, DE, Apr. 15-23, 2010.
International Search Report for PCT/KR2013/005613 filed on Jun. 25, 2013.
Planar mode experiments and results, Joint Collaborative Team on Video Coding of ITU-T SG16 WP3 and ISO/IEC JTC1/SC29/WG11, JCTVC-E321 (Mar. 20, 2011).
High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013.
"Description of video coding technology proposal by Tandberg, Nokia, Ericsson" Joint Collaborative Team on Video Coding (JCT-VC) of ITU-T SG16 WP3 and ISO/IEC JTC1/SC29/WG11 1st Meeting: Dresden, DE, Apr. 15-23, 2010.
Office Action issued on May 11, 2021 for the corresponding U.S. Appl. No. 16/899,978.
Office Action issued from Korea Intellectual Property Office (KIPO) on May 23, 2022 for the corresponding Korean Patent Application No. 10-2021-0154407.
Series H: Audiovisual and Multimedia Systems; Infrastructure of audiovisual services—Coding of moving video . High efficiency video coding. ITU-T Telecommunication Standardization Sector of ITU H.265 (Apr. 2013).
Office action from Korean Patent Office for Application No. 10-2023-0155557 dated Sep. 27, 2024.

\* cited by examiner

FIG. 2
|  | I0 | I1 | I2 | I3 | I4 | I5 | I6 | I7 | I8 |
|---|---|---|---|---|---|---|---|---|---|
| q0 |  | P0 | P1 | P2 | P3 |  |  |  |  |
| q1 |  | P4 | P5 | P6 | P7 |  |  |  |  |
| q2 |  | P8 | P9 | P10 | P11 |  |  |  |  |
| q3 |  | P12 | P13 | P14 | P15 |  |  |  |  |
FIG. 3
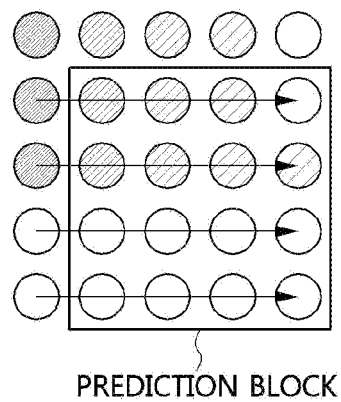
PREDICTION BLOCK
FIG. 4
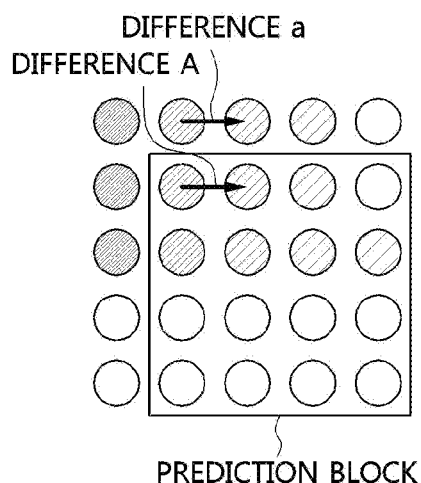
DIFFERENCE a
DIFFERENCE A
PREDICTION BLOCK

PREDICTION BLOCK

PREDICTION BLOCK

FIG. 9B

| PREDICTION CANDIDATE VALUE | CODE WORD |
|---|---|
| a | 0 |
| b | 10 |
| c | 11 |

FIG. 10A

| FLAG VALUE | RESIDUAL VALUE |
|---|---|

FIG. 10B

| RESIDUAL VALUE | FLAG VALUE |
|---|---|

VIDEO ENCODING AND DECODING METHOD

CROSS REFERENCE PARAGRAPH

This application is a continuation of U.S. patent application Ser. No. 17/945,847, filed on Sep. 15, 2022, which is a continuation of U.S. patent application Ser. No. 17/237,494, filed on Apr. 22, 2021, now issued as U.S. Pat. No. 11,483,572 on Oct. 25, 2022, which is a continuation of U.S. patent application Ser. No. 16/662,291, filed on Oct. 24, 2019, now issued as U.S. Pat. No. 11,051,028 on Jun. 29, 2021, which is a continuation of U.S. patent application Ser. No. 15/495,880, filed on Apr. 24, 2017, now issued as U.S. Pat. No. 10,491,905 on Nov. 26, 2019, which is a continuation of U.S. patent application Ser. No. 14/411,088, filed on Mar. 27, 2015, now issued as U.S. Pat. No. 9,667,965 on May 30, 2017, which is a U.S. National Stage Entry of PCT application No. PCT/KR2013/005613, filed on Jun. 25, 2013, which claims priority from and the benefit of Korean Patent Application Nos. 10-2012-0068019, filed on Jun. 25, 2012, 10-2013-0060060 filed on May 28, 2013, and 10-2013-0072111 filed on Jun. 24, 2013, in the Korean Intellectual Property Office, the disclosures of which are incorporated herein by reference.

TECHNICAL FIELD

The present invention relates to video encoding and decoding, and more particularly, to an apparatus and method for encoding and decoding a video that may enhance accuracy of intra-prediction.

BACKGROUND ART

Recently, with the advent of a smartphone and a smart TV, the use of video data through a wired/wireless communication network tends to grow explosively. Since video data has an excellent information delivery ability but a very large capacity, compared to general text data, the video data has difficulties in being transmitted or replayed and stored on a network channel having a limited bandwidth. In addition, since vast video information is appropriately processed according to requirement of an application, a system for processing a video also requires a high specification.

The video encoding includes lossy coding and lossless coding. H.264/AVC supports the lossless coding in addition to the lossy coding. In particular, for the lossless encoding, a more efficient lossless coding technique has been adopted in H.264/AVC Fidelity Range Extension (FRExt) standardization. The lossless encoding technique that has been adopted in FRExt does not just perform transformation and quantization in order to prevent loss of data. That is, lossless compression may be performed by performing entropy coding directly on residual signals found through intra-prediction and inter-prediction, without transformation and quantization.

In addition, standardization for high efficient video coding (HEVC) has recently been completed as next-generation video compression standard technology that is known to have compression efficiency approximately twice as great as conventional H.264/AVC.

HEVC defines a coding unit (CU), a prediction unit (PU), and a transform unit (TU), which form a quadtree structure, and applies an additional in-loop filter such as a sample adaptive offset (SAO) and a deblocking filter. In addition, HEVC enhances a compression encoding efficiency by improving the existing intra-prediction and inter-prediction.

In the intra-prediction, encoding is performed using, as a prediction value for a pixel currently intended to be encoded, a value of a pixel around the current pixel directly or a value generated by performing processes such as a filtering on several pixels around the current pixel. In addition, a difference between a value generated through the prediction and a value of the current pixel is transmitted and encoded along with other additional information (information regarding an intra-prediction mode, for example, a DC mode, a horizontal direction mode, or a vertical direction mode).

Here, in order to determine a prediction value of a current block, the intra-prediction uses a boundary pixel of a neighbor block that has ever been encoded and then reconstructed. However, the intra-prediction method has a limitation in that a prediction error increases as a distance between a reference pixel and a current pixel increases.

Furthermore, when the intra-prediction is not performed well despite any intra-prediction mode depending on characteristics of a video, a difference that should be transmitted to a decoding apparatus is increased, thus resulting in reduction of an encoding efficiency. In particular, for a complicated region in which a DC mode is applied, since the intra-prediction is performed using an average value of pixels around the current pixel, it is difficult to accurately predict the current pixel. That is, since a difference between a value of the current pixel and its prediction value increases, the encoding efficiency may be lowered.

Furthermore, for a planar mode according to the HEVC, when the current pixel is positioned further inward, a distance between the current pixel and the reference pixel increases and accuracy of the prediction is reduced.

DISCLOSURE

Technical Problem

The present invention is directed to providing an intra-prediction method that increases the accuracy of intra-prediction to enhance encoding efficiency.

The present invention is also directed to providing a method of decoding a video encoded with an increased accuracy of the intra-prediction.

The present invention is also directed to providing an apparatus for decoding a video encoded with an increased accuracy of the intra-prediction.

Technical Solution

One aspect of the present invention provides a video decoding method including: calculating a difference between a current pixel positioned in a first pixel line according to an intra-prediction direction and a previous pixel prior to the current pixel corresponding to the intra-prediction direction, calculating a predication value based on a difference between a current prediction pixel corresponding to the current pixel and a previous prediction pixel corresponding to the previous pixel, the current prediction pixel and the previous prediction pixel being positioned in a second pixel line prior to the first pixel line corresponding to the intra-prediction direction, and receiving a bit stream generated by performing entropy encoding on a corrected difference that is calculated by correcting the difference with reference to the prediction value; and decoding the received bit stream and generating a reconstructed image based on the reconstructed difference and intra-prediction information.

Another aspect of the present invention provides a video decoding method including: decoding a received bit stream to generate reconstructed information including a residual value for a current pixel and intra-prediction information; determining a final prediction value based on a value obtained by adding the residual value for the current pixel to a prediction value of the current pixel according to the intra-prediction mode based on the intra-prediction information and at least one prediction candidate value using a neighbor pixel adjacent to the current pixel; and adding the residual value for the current pixel to the final prediction value to generate a reconstructed image.

Still another aspect of the present invention provides a video decoding method including: decoding received bit stream to generate reconstruction information including a residual value for a current pixel and intra-prediction information; generating a first prediction value using a first reference pixel and a pixel T at an upper right corner of a current block including the current pixel based on the intra-prediction information; generating a second prediction value using a second reference pixel and a pixel L at a lower left corner of the current block including the current pixel based on the intra-prediction information; and generating a final prediction value for the current pixel using the first prediction value and the second prediction value.

Advantageous Effects

With the video decoding method according to the present invention, it is possible to decode a bit stream lossless-video-encoded with an increased prediction efficiency of a pixel when intra-prediction is performed.

In addition, the intra-prediction method and apparatus using an additional prediction candidate according to an embodiment of the present invention may enhance accuracy of the intra-prediction by using an additional prediction candidate.

Furthermore, an apparatus and method for encoding and decoding a video using the intra-prediction according to an embodiment of the present invention can enhance accuracy of the intra-prediction by performing the intra-prediction using a reference pixel having high correlation.

Moreover, the accuracy of the intra-prediction can be enhanced by applying a weight that is based on a direction of the current block when a planar mode is applied.

DESCRIPTION OF DRAWINGS

FIG. 2 is a conceptual view illustrating a current block and a pixel adjacent thereto.

FIG. 3 is a conceptual view illustrating a partially changing current block and a pixel adjacent thereto.

FIG. 4 is a conceptual view illustrating intra-prediction according to an embodiment of the present invention.

FIGS. 9A and 9B are exemplary views illustrating transmission of information regarding a final prediction value according to an embodiment of the present invention.

FIGS. 10A and 10B are conceptual views illustrating a structure of a bit stream according to an embodiment of the present invention.

MODES OF THE INVENTION

Figure 1:
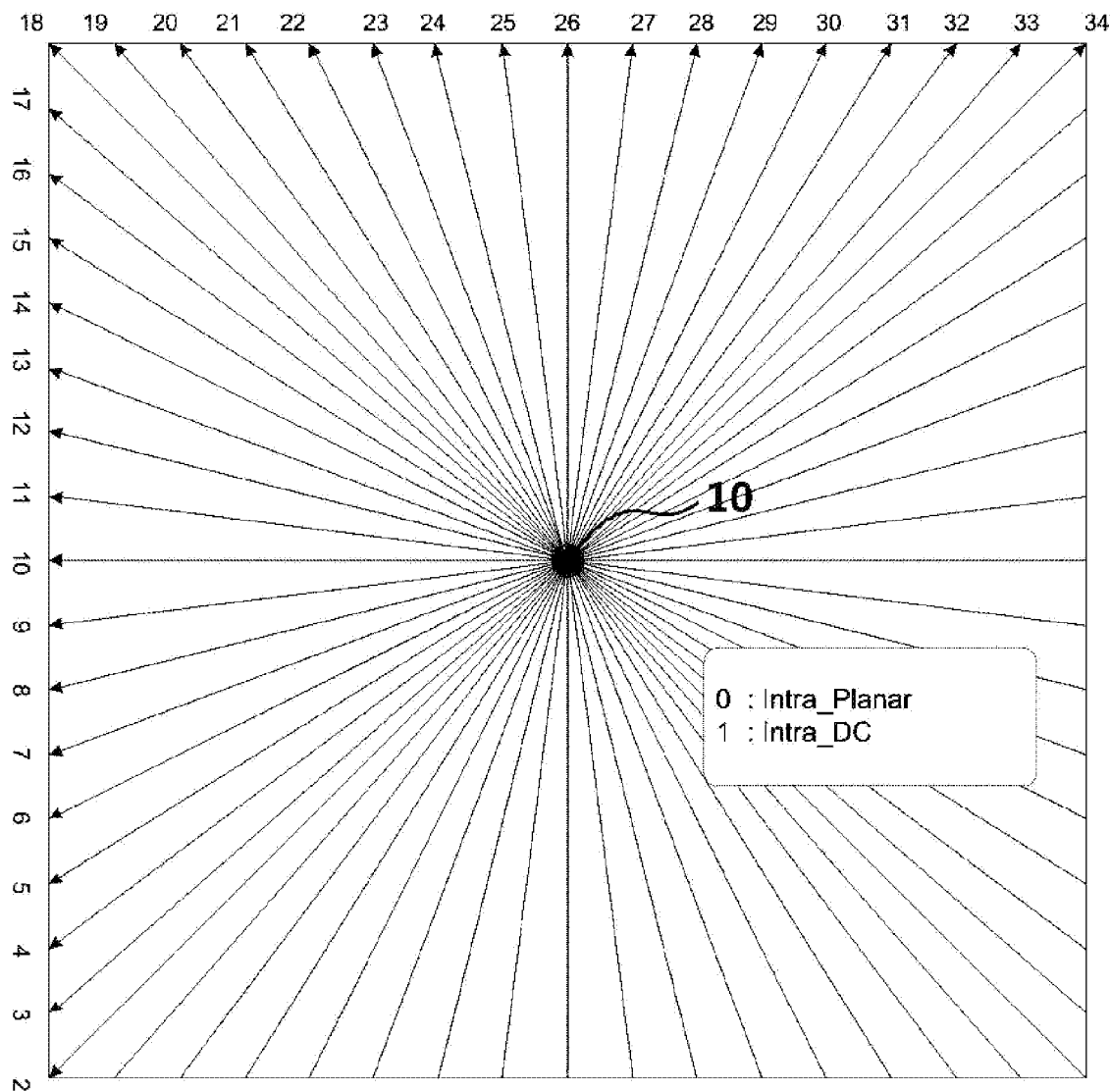
FIG. 1 is a conceptual view illustrating an intra-prediction mode according to HEVC standard.

While the invention is susceptible to various modifications and alternative forms, specific embodiments thereof are shown by way of example in the drawings and will herein be described in detail. However, it should be understood that the present invention is not limited to these embodiments, and may include any and all modification, variations, equivalents, substitutions and the like within the spirit and scope thereof. Like reference numerals refer to like elements throughout.

Relational terms such as first, second, and the like may be used for describing various elements, but the elements should not be limited by the terms. These terms are only used to distinguish one element from another. For example, a first component may be called a second component, and a second component may also be called a first component without departing from the scope of the present invention. The term 'and/or' means any one or a combination of a plurality of related and described items.

When it is mentioned that a certain component is "coupled with" or "connected with" another component, it should be understood that the certain component is directly "coupled with" or "connected with" to the other component or another component may be located therebetween. In contrast, when it is mentioned that a certain component is "directly coupled with" or "directly connected with" another component, it will be understood that no component is located therebetween.

The terms used in the present specification are set forth to explain the embodiments of the present invention, and the scope of the present invention is not limited thereto. The singular number includes the plural number as long as they are not apparently different from each other in meaning. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

A video encoding apparatus and a video decoding apparatus that will be described below may be a user terminal such as a personal computer (PC), a laptop computer, a personal digital assistant (PDA), a portable multimedia player (PMP), a PlayStation Portable (PSP), a wireless communication terminal, a smart phone, and a TV or a server terminal such as an application server and a service server, and may denote a variety of apparatus including a communication device, such as a communication modem, for communicating with wired/wireless communication networks, a memory for storing various programs and data used to encode or decode an video or perform inter or intra-prediction for encoding or decoding, a microprocessor for executing the programs to perform calculation and control, and so on.

In addition, an image encoded into a bit stream by the video encoding apparatus is transmitted, in real time or in non-real time, to the video decoding apparatus through a wired/wireless communication network such as the Internet, a local wireless network (LAN), a wireless LAN, a WiBro network, a mobile communication network and through a variety of communication interfaces such as a cable, a Universal Serial Bus (USB), or the like. The video decoding apparatus decodes the encoded image and replays the reconstructed image.

Typically, a video may include a series of pictures, each of which may be divided by a certain region such as a frame or block.

In addition, in the high efficiency video coding (HEVC) standard, the concepts of a coding unit (CU), a prediction unit (PU), and a transform unit (TU) are defined. The CU is similar to macroblock. However, the encoding may be performed while the CU is variably adjusted. The PU is determined from a unit of encoding that is not divided any more, and may be determined through a prediction type and a PU splitting process. The TU is a TU for transformation and quantization, and may be greater than the PU in size, but cannot be greater than the CU in size. Accordingly, in the present invention, a block may be understood to have the same meaning as a unit.

In addition, a block or pixel referenced to encode or decode a current block or a current pixel is referred to as a reference block or reference pixel. It will be understood by those skilled in the art that the term 'picture' used herein may be replaced with other terms having the same meaning as an image, a frame, and the like.

Preferred embodiments of the present invention will be described below in more detail with reference to the accompanying drawings.

FIG. 1 is a conceptual view illustrating an intra-prediction mode according to HEVC standard.

Referring to FIG. 1, the HEVC standard provides 35 intra-prediction modes. As the number of prediction modes increases, the number of overhead bits for transmitting mode information increases. However, further accurate prediction may be performed to reduce a prediction error using various prediction modes.

Mode 0 is a planar mode, mode 1 is a DC mode, and mode 2 to mode 34 are angular modes. The intra-prediction modes are simply described as follows.

The planar mode is a method that is designed to efficiently encode a visually smooth image, and is efficient to predict a region in which a pixel value gradually changes. The DC mode uses, as a prediction value, an average value of nearby pixels of a current prediction block.

In addition, the angular mode performs prediction based on a total of 33 directions including a vertical direction and a horizontal direction. The vertical mode or horizontal mode copies a nearby pixel value in a vertical or horizontal direction and uses the copied value as the prediction value. Angular prediction modes other than the horizontal mode and the vertical mode generate a prediction value through linear interpolation because intra-prediction is performed in directions, in which 45 degrees is divided by 32 at the same angle with respect to an origin 10, and thus pixels according to respective directions are not at an equal distance.

Intra-Prediction Referencing Pixel of Adjacent Line

FIG. 2 is a conceptual view illustrating a current block and a pixel adjacent thereto.

FIG. 2 shows a current block, which is a 4×4 block, and an adjacent pixel of a block neighboring to the current block. When an intra-prediction mode direction of the current block is horizontal, p0 may be predicted from q0, p1 may be predicted from p0, and p2 may be predicted from p1. For example, a prediction error, which is a difference between pixels, may be calculated not as p0−q0, p1−q0, p2−q0, p3−q0, but as p0−q0, p1−p0, p2−p1, and p3−p2. Here, the prediction error may be indicated as r0=p0−q0, r1=p1−p0, and r2=p2−p1.

That is, for lossless video encoding and decoding, a prediction error transmitted to a decoding apparatus may be indicated as r0=p0−q0, r1=p1−p0, r2=p2−p1, and image reconstruction may be performed as follows: q0+r0 for p0, q0+r0+r1 for p1, q0+r0+r1+r2 for p2, and q0+r0+r1+r2+r3 for p3.

Accordingly, the prediction error may be calculated by a difference between a current pixel that is positioned in a pixel line in an intra-prediction direction and a previous pixel that is prior to the current pixel corresponding to the intra-prediction direction. Here, the pixel line may be considered as a line of connecting pixels having the same direction as a direction of an intra-prediction mode.

FIG. 3 is a conceptual view illustrating a partially changing current block and a pixel adjacent thereto.

Referring to FIG. 3, an intra-prediction block to be intra-predicted generally has a direction in a horizontal direction, but includes an area in which its direction varies partially. In this case, when a prediction error is calculated based on a difference between pixels positioned in a horizontal pixel line, there is an area having a great difference and thus the number of bits increases, thereby reducing coding efficiency.

For example, for a first pixel line and a second pixel line from the top in the prediction block, a large difference between a current pixel positioned in a pixel line in an intra-prediction direction (horizontal direction) and a previous pixel positioned previously to the current pixel corresponding to the intra-prediction direction may occur, thus reducing the coding efficiency. That is, compared to the case of a third pixel line and a fourth pixel line from the top in the prediction block, the case of the first pixel line and the second pixel line from the top in the prediction block may generate a large difference between the current pixel and the previous pixel.

FIG. 4 is a conceptual view illustrating intra-prediction according to an embodiment of the present invention.

The case in which the prediction direction according to the intra-prediction mode is a horizontal direction will be described with reference to FIG. 4.

The difference between the current pixel positioned in the first pixel line according to the intra-prediction direction and the previous pixel prior to the current pixel corresponding to the intra-prediction direction is calculated. A prediction value may be calculated based on a previous difference between a current prediction pixel corresponding to the current pixel and a previous prediction pixel corresponding to the previous pixel, in which the current prediction pixel and the previous prediction pixel are positioned in a second pixel line prior to the first pixel line corresponding to the intra-prediction direction. Entropy-encoding may be performed on a corrected difference that is calculated by correcting the difference with reference to the prediction value. That is, a process that may reduce the difference through additional prediction of the prediction error is performed. Thus, the encoding efficiency may be enhanced by decreasing the difference (prediction error) between the current pixel and the previous pixel while performing the lossless video encoding.

For example, when the intra-prediction direction is a horizontal direction, a difference A between a current pixel and a previous pixel that are positioned in a first pixel line from the top in the intra-prediction block may be corrected using, as a prediction value, a difference a between a current prediction pixel corresponding to the current pixel and a previous prediction pixel corresponding to the previous pixel, which are positioned a pixel line directly above the intra-prediction block. In addition, a corrected difference A-a may be calculated through correction in which the prediction value a is subtracted from the difference A.

That is, since pixels included in the first pixel line from the top of the intra-pixel block and pixels included in the pixel line directly above the intra-prediction block may change in a similar pattern to each other, correction for reducing the difference A may be performed through additional prediction, thus enhancing coding efficiency.

In addition, the difference a between pixels positioned in a previous line (second pixel line) may be used as a prediction value without change, and a value a* obtained by multiplying the difference a by a weight may be used as a prediction value a* of the difference A. Here, the weight may be determined based on continuity of pixels.

For example, in FIG. 4, pixels included in the second pixel line from the top of the intra-prediction block and pixels included in the third pixel line from the top of the intra-prediction block do not change in a similar pattern to each other. That is, in consideration of the third pixel line from the top of the intra-prediction block as a first pixel line and considering the second pixel line from the top of the intra-prediction block as a second pixel line, when a difference a between pixels positioned in the second pixel line is used as a prediction value of the difference A between the current pixel and the previous pixel that are positioned in the first pixel line, the number of bits may rather increase. In this case, this may be adjusted using, as the prediction value, a value a* obtained by multiplying the difference a between the pixels positioned in the second pixel line by a weight. In this case, the weight may be greater than 1, causing the prediction value a* to increase, and also may be less than 1, causing the prediction value a* to decrease.

When the weight is determined as ½₅₅ for an image formed of 8-bit pixel (in this case, a pixel may have a maximum of 255), the value a* obtained by multiplying the difference a between the pixels positioned in the second pixel line by the weight may becomes close to zero.

Figure 5:
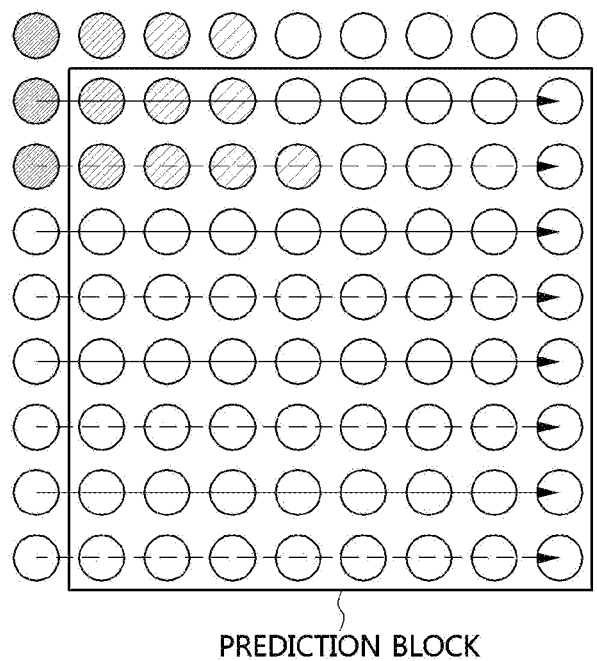
FIG. 5 is a conceptual view illustrating intra-prediction according to another embodiment of the present invention.

FIG. 5 is a conceptual view illustrating intra-prediction according to another embodiment of the present invention.

Referring to FIG. 5, a first pixel line may be indicated as a solid line, and a second pixel line may be indicated as a dashed line. That is, first pixel lines may pass through an intra-prediction block to be intra-predicted and may be positioned a distance corresponding to at least one pixel line apart from one another, and the second pixel lines may be positioned a distance corresponding to at least one pixel line apart from one another. For example, in the intra-prediction block, the first block lines may be odd-numbered lines from the top, and the second block lines may be even-numbered lines from the top.

First, a difference between a current pixel that is positioned in the first pixel line in an intra-prediction direction (horizontal direction) and a previous pixel that is prior to the current pixel corresponding to the intra-prediction direction may be calculated and then entropy-encoded. That is, a difference between pixels positioned in each of the first pixel lines that are positioned a distance corresponding to at least one pixel line apart from one another may be entropy-encoded and then transmitted without correction by the prediction value.

Next, a difference between pixels positioned in the second pixel line may be corrected using, as the prediction value, the difference between the pixels positioned in the first pixel line.

Accordingly, the entropy-encoding may be performed on a difference that is calculated for each distance corresponding to the at least one pixel line. A corrected difference may be calculated through correction for the difference between the pixels positioned in the second pixel line, in which the correction is performed with reference to the prediction value that is based on the difference that is calculated for each distance corresponding to the at least one pixel line. The corrected difference may be performed on the entropy-encoding.

For example, the odd-numbered pixel line may be not corrected using the prediction value, and the even-numbered line may be corrected with reference to the prediction value that is based on the difference calculated in the odd-numbered line. A corrected difference that is calculated through the correction may be utilized as a prediction error.

In addition, a difference between pixels that is calculated in a first pixel line positioned above or below the second pixel line may be utilized as the prediction value. That is, assuming that a difference for the first pixel line above the second pixel line is a and a difference for the first pixel line below the second pixel line is b, when a difference for the second pixel line that is the reference line is A, the difference A for the second pixel line may be corrected using a or b as the prediction value. In this case, in order to reduce the difference A, a value that has a smaller difference with A between a and b may be utilized as the prediction value, and information regarding which value has been selected between a and b is additionally transmitted to a decoding apparatus. Thus the decoding apparatus may be aware of which first pixel line the difference used as the prediction value is for.

For example, when the difference for the first pixel line positioned above is 12, the difference for the first pixel line positioned below is 25, and the difference for the second pixel line that is the reference is 14, the difference for the first pixel line positioned above may be used as a prediction value of the difference for the second pixel line that is the reference. In this case, information regarding that the difference for the first pixel line positioned above has been selected as the prediction value and the corrected difference of 2 may be encoded and then transmitted to the decoding apparatus.

Alternatively, when a value of |a−b| that is a difference between the difference a for the first pixel line positioned above and the difference b for the first pixel line positioned below is less than a preset threshold value TH, transmission of selection information may rather reduce the coding efficiency. According, when |a−b|<TH, the prediction may be performed using preset information (selection of a or b).

Although the above-described embodiment of the present invention has been described with reference to the case in which the intra-prediction direction is a horizontal direction, the present invention may also be applied to an intra-prediction mode having a different direction. In addition, the above-described weight or selection information may be transmitted through a sequence, a picture, a slice, or the like and then used, or conforms to agreement between the encoding apparatus and the decoding apparatus.

Figure 6:
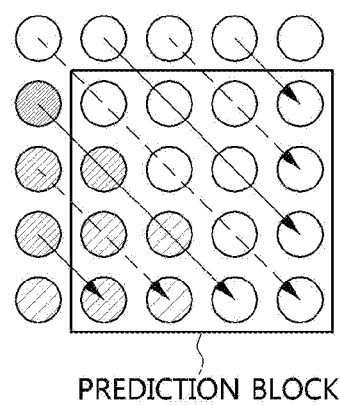
FIG. 6 is a conceptual view illustrating intra-prediction according to still another embodiment of the present invention.

FIG. 6 is a conceptual view illustrating intra-prediction according to still another embodiment of the present invention.

FIG. 6 shows a case in which another intra-prediction direction (diagonal down-right direction) is used. In FIG. 6, the first pixel line may be indicated as a solid line, and the second pixel line may be indicated as a dashed line. That is, first pixel lines may be positioned a distance corresponding to at least one pixel line apart from one another, and the second pixel lines may be positioned a distance corresponding to at least one pixel line apart from one another. For example, in the intra-prediction block, the first block lines may be odd-numbered lines from the top, and the second block lines may be even-numbered lines from the top.

First, a difference between a current pixel that is positioned in the first pixel line in an intra-prediction direction (horizontal direction) and a previous pixel that is prior to the current pixel corresponding to the intra-prediction direction may be calculated and then entropy-encoded. That is, a difference between pixels positioned in each of the first pixel lines that are positioned a distance corresponding to at least one pixel line apart from one another may be entropy-encoded and then transmitted without correction by the prediction value.

Next, a difference between pixels positioned in the second pixel line may be corrected using, as the prediction value, the difference between the pixels positioned in the first pixel line.

Accordingly, the above-described embodiment of the present invention may be applied to the case in which the intra-prediction direction is the diagonal down-right direction and also an intra-prediction mode having a different direction. Furthermore, the above-described embodiment of the present invention may also be applied to a planar prediction, an angular prediction, and an arbitrary direction intra-prediction (ADI), which are intra-prediction methods conforming to the HEVC that is currently being standardized.

Figure 17:
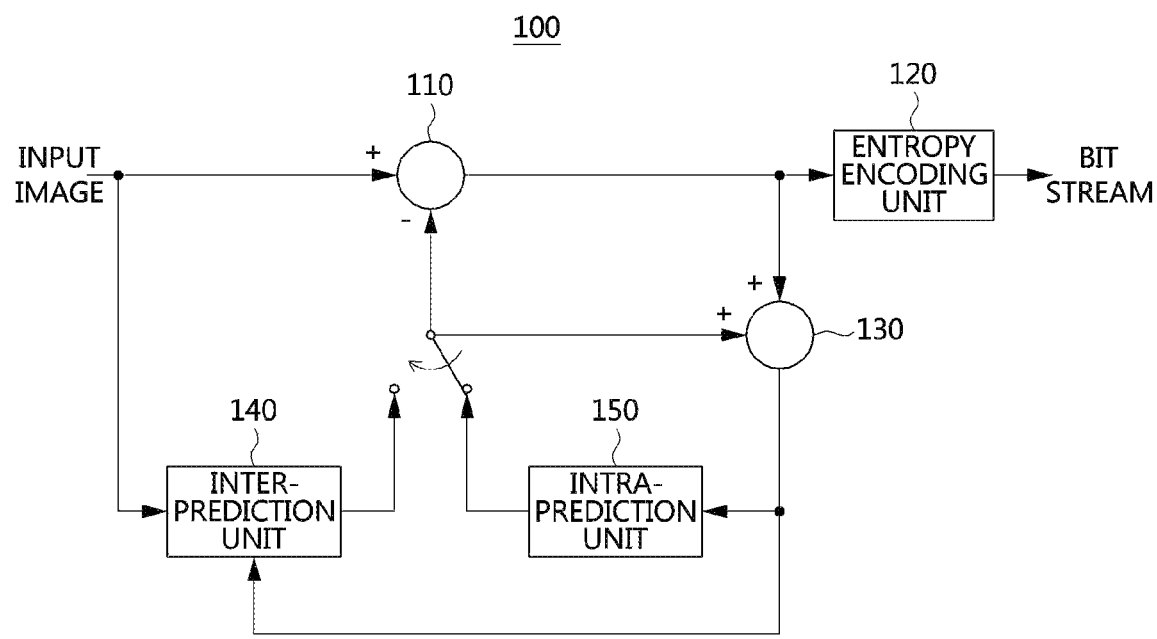
FIG. 17 is a block diagram illustrating a video encoding apparatus according to an embodiment of the present invention.

FIG. 17 is a block diagram illustrating a video encoding apparatus according to an embodiment of the present invention.

Referring to FIG. 17, the encoding apparatus according to an embodiment of the present invention includes a subtractor 110, an entropy encoding unit 120, an adder 130, an inter-prediction unit 140, and an intra-prediction unit 150.

For a lossy encoding apparatus, entropy-encoding is performed after transformation and quantization. However, for a lossless encoding apparatus, the entropy-encoding is performed directly. When an input image is entered, a residual block (difference) obtained by inter-predicting or intra-predicting the input image may be transmitted to the entropy encoding unit. Except for this, the lossless encoding apparatus is similar to the lossy encoding apparatus, and thus a detailed description thereof will not be provided.

The encoding apparatus 100 according to an embodiment of the present invention may calculate a difference between a current pixel that is positioned in a first pixel line in an intra-prediction direction and a previous pixel that is prior to the current pixel corresponding to the intra-prediction direction.

The encoding apparatus 100 may calculate a prediction value based on a previous difference between a current prediction pixel corresponding to the current pixel and a previous prediction pixel corresponding to the previous pixel, in which the current prediction pixel and the previous prediction pixel are positioned in a second pixel line prior to the first pixel line corresponding to the intra-prediction direction.

The encoding apparatus 100 may perform entropy-encoding on a corrected difference that is calculated by correcting the difference with reference to the prediction value. The encoded bit stream may include a prediction error, which is information regarding the difference, and intra-prediction information. Here, the intra-prediction information may include a block size, an intra-prediction mode, information regarding the prediction value (selection information), and so on.

Accordingly, the encoding apparatus 100 according to an embodiment of the present invention may enhance the encoding efficiency by decreasing the difference (prediction error) between the current pixel and the previous pixel while performing the lossless video encoding.

Figure 18:
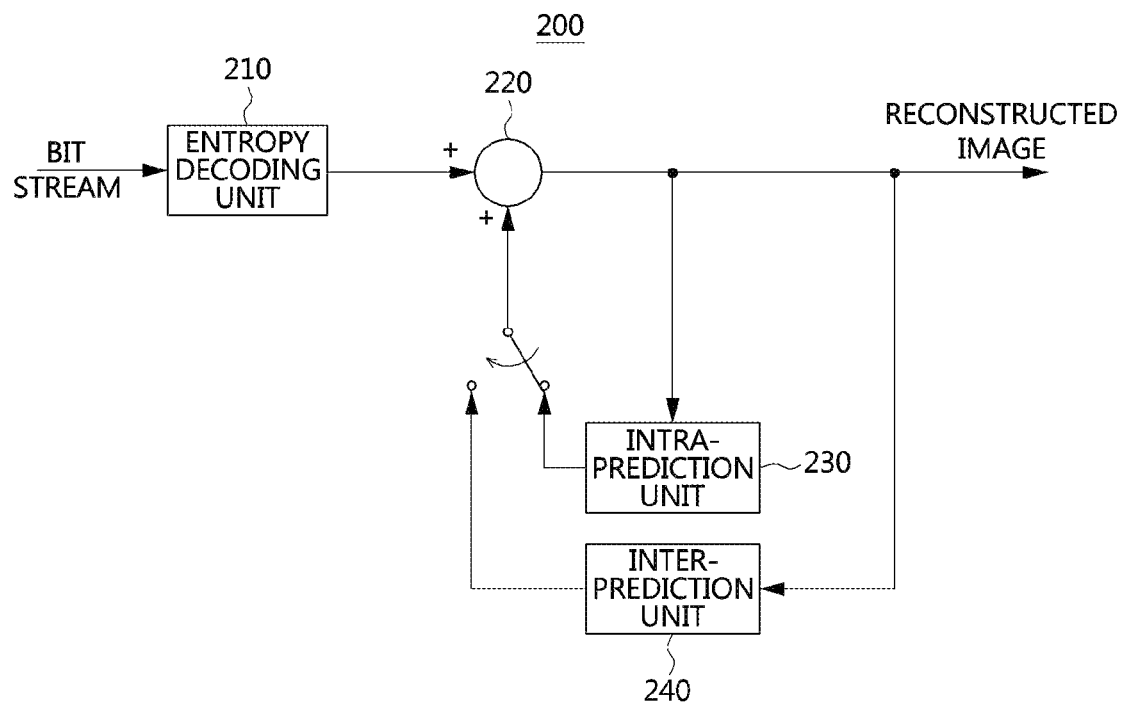
FIG. 18 is a block diagram illustrating a video decoding apparatus according to an embodiment of the present invention.

FIG. 18 is a block diagram illustrating a video decoding apparatus according to an embodiment of the present invention.

Referring to FIG. 18, the decoding apparatus 200 according to an embodiment of the present invention includes an entropy decoding unit 210, an adder 220, an intra-prediction unit 230, and an inter-prediction unit 240. For a lossy decoding apparatus, inverse quantization and inverse transformation are performed after entropy-decoding. However, for a lossless decoding apparatus, the inverse quantization and inverse transformation are not performed. Except for this, the lossless decoding apparatus is similar to the lossy decoding apparatus, and thus a detailed description thereof will not be provided.

The entropy decoding unit 210 may receive and decode a bit stream generated by the above-described lossless video encoding method or lossless video encoding apparatus to generate a reconstructed difference and intra-prediction information.

The intra-prediction unit 230 may generate a prediction pixel through the intra-prediction based on the intra-prediction information.

The adder 220 may add the reconstructed difference to the prediction pixel to generate a reconstructed image.

With the above-described video encoding and decoding techniques according to the present invention, it is possible to increase the encoding efficiency by increasing prediction efficiency of a pixel intended to be currently predicted with reference to variations of surrounding pixels in the intra-prediction.

Intra-Prediction Using Additional Prediction Candidate

Figure 7:
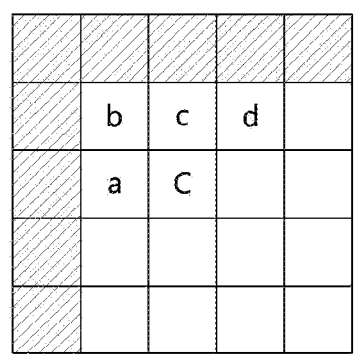
FIG. 7 is a conceptual view illustrating an intra-prediction method using an additional prediction candidate according to an embodiment of the present invention.

FIG. 7 is a conceptual view illustrating an intra-prediction method using an additional prediction candidate according to an embodiment of the present invention.

An intra-prediction method for a current block with a size of 4×4 will be described with reference to FIG. 7. However, the size of the current block is not limited to 4×4.

Conventionally, a prediction value of a current pixel C may be generated according to an intra-prediction mode. For example, when the intra-prediction mode is a DC mode, an average value of surrounding pixels of the current block may be used as the prediction value of the current pixel C. That is, an average value of pixels in a region filled with diagonal lines in FIG. 2 may be used as the prediction value of the current pixel C. In this case, however, accuracy in the prediction is degraded and thus a residual value may increase.

According to an embodiment of the present invention, at least one candidate prediction value based on neighbor pixels a, b, c, and d adjacent to the current pixel C may be additionally used. For example, the pixels neighboring the current pixel C may use, as candidate prediction values, pixel values of neighbor pixels a, b, c, and d positioned in a left side, an upper left side, an upper side, and an upper right side.

Accordingly, a final prediction value may be determined between the prediction value for the current pixel C according to the intra-prediction mode and the at least one candidate prediction value, and a residual value may be generated using a difference between the final prediction value and the pixel value of the current pixel C. However, the present invention is not limited to the positions and number of neighbor pixels.

A case in which the intra-prediction mode is a DC mode will be described as an example.

When the intra-prediction mode is the DC mode, an average value of surrounding pixels of the current block may be used as the prediction value of the current pixel C. However, when the difference between the pixel value of the current pixel C and the prediction value of the current pixel C according to the DC mode is great, the number of bits to be transmitted to the decoding apparatus may increase.

This occurs because a correlation between the prediction value of the current pixel C and the pixel value of the current pixel C is low, and the encoding efficiency may be prevented from being reduced by applying an additional candidate prediction value.

For example, the final prediction value may be determined between the prediction value of the current pixel C and at least one candidate prediction value that is based on a neighbor pixel adjacent to the current pixel C. That is, the final prediction value may be determined by comparing the difference between the prediction value of the current pixel C and the pixel value of the current pixel C with the difference between the pixel value of the current pixel C and at least one candidate prediction value and check a case in which the difference is smallest.

In addition, a residual value may be generated using the difference between the determined final prediction value and the pixel value of the current pixel C.

Accordingly, it is possible to reduce the number of bits to be transmitted to the decoding apparatus by utilizing the final prediction value having the smallest residual value.

Figure 8A:
FIGS. 8A to 8C are conceptual views illustrating a method of determining a final prediction value according to an embodiment of the present invention.
Figure 8B:
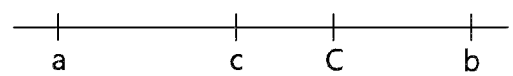
Figure 8C:
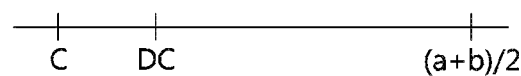

FIGS. 8A to 8C are conceptual views illustrating a method of determining a final prediction value according to an embodiment of the present invention.

Referring to FIGS. 8A to 8C, the final prediction value according to an embodiment of the present invention may be determined through various combinations of candidate prediction values. Here, the pixel value may be represented as 0 to 255 for the 8-bit image, and a distance between pixels may represent a difference between the pixels.

First, referring to FIG. 8A, the final prediction value may be determined using, as candidate prediction values, prediction value of the current pixel C according to the DC mode and pixel values of the neighbor pixels a and b positioned in the left side and the left upper side of the current pixel C.

That is, the pixel value of the current pixel C may cause the smallest difference with respect to the pixel value of the pixel b. Accordingly, the pixel value of the pixel b may be determined as the final prediction value.

Next, referring to FIG. 8B, the final prediction value may be determined using, as candidate prediction values, pixel values of the neighbor pixels a, b, and c positioned in the left side, left upper side, and upper side of the current pixel C.

That is, the pixel value of the current pixel C may cause the smallest difference with the pixel value of the pixel c. Accordingly, the pixel value of the pixel c may be determined as the final prediction value.

In addition, referring to FIG. 8C, the final prediction value may be determined using, as candidate prediction values, prediction value of the current pixel C according to the DC mode and an average value (a+b)/2 of pixel values of the neighbor pixels a and b positioned in the left side and the left upper side of the current pixel C.

That is, the pixel value of the current pixel C may cause the smallest difference with respect to the prediction value of the current pixel C. Accordingly, the prediction value of the current pixel C according to the DC mode may be determined as the final prediction value.

Accordingly, according to an embodiment of the present invention, it is possible to determine the final prediction value that causes the smallest residual value through a various combination of candidate prediction values. Here, information regarding the combination, positions, and numbers of the candidate prediction values may be transmitted to the decoding apparatus through a sequence, a picture, a slice, a block, or the like, or may be preset between the encoding apparatus and the decoding apparatus.

Figure 9A:
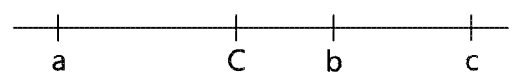

FIGS. 9A and 9B are exemplary views illustrating transmission of information regarding a final prediction value according to an embodiment of the present invention, and FIGS. 10A and 10B are conceptual views illustrating a structure of a bit stream according to an embodiment of the present invention.

Referring to FIGS. 9A and 9B, the final prediction value may be determined using, as candidate prediction values, pixel values of the neighbor pixels a, b, and c positioned in the left side, left upper side, and upper side of the current pixel C.

That is, the pixel value of the current pixel C may cause the smallest difference with respect to the pixel value of the pixel b. Accordingly, the pixel value of the pixel b may be determined as the final prediction value.

In this case, addition, the difference between the pixel value of pixel b and the pixel value of the current pixel C may be determined as a residual value. Furthermore, information regarding determination of the final prediction value may be additionally transmitted.

Meanwhile, a code word for identifying neighbor pixels adjacent to the current pixel C may be previously assigned. For example, a code word of 0 may be assigned to the left pixel a of the current pixel C, a code word of 10 may be assigned to the left upper pixel b of the current pixel C, and a code word of 11 may be assigned to the upper pixel c of the current pixel C. FIG. 4B shows an exemplary method of setting the code word, and various methods may be utilized.

Accordingly, a code word of 10 may be added to a residual value and transmitted to the decoding apparatus, in which the residual value is the difference between the pixel value of pixel b and the pixel value of the current pixel C.

Here, information regarding the code word and the combination of the candidate prediction values may be transmitted to the decoding apparatus through a sequence, picture, slice, block, or the like, or may be preset between the encoding apparatus and the decoding apparatus. That is, the encoding apparatus and the decoding apparatus may share information regarding the positions and number of neighbor pixels that are utilized as candidate prediction values.

Referring to FIGS. 10A and 10B, a bit stream transmitted to the decoding apparatus may include a residual value and a flag value. As shown in FIG. 10A, the residual value may be transmitted after the flag value is first transmitted. As shown in FIG. 10B, the flag value may be transmitted after the residual value is transmitted.

Here, the flag value may include information regarding the candidate prediction value, which may denote the positions and number of neighbor pixels, which are bases of the candidate prediction values.

Furthermore, even when the flag value is not transmitted to the decoding apparatus, the final prediction value may be logically determined according to a rule that is preset to the encoding apparatus and the decoding apparatus.

Figure 11A:
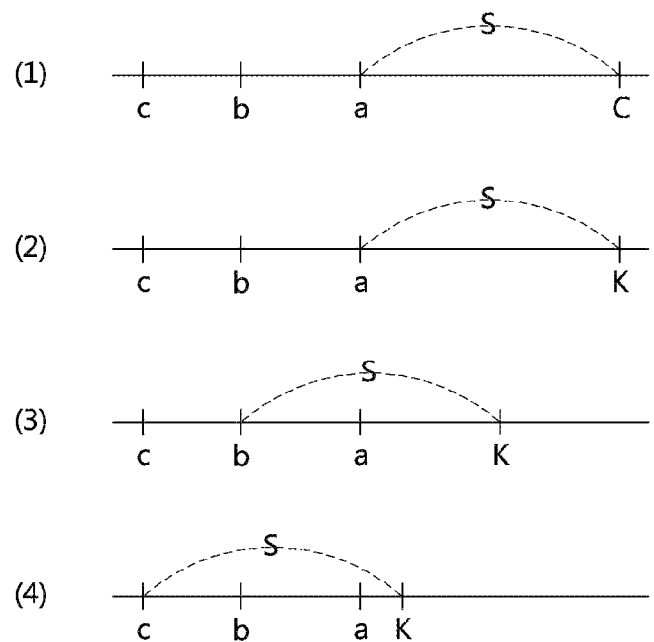
FIGS. 11A and 11B are conceptual views illustrating a method of determining a final prediction value in a decoding method according to an embodiment of the present invention.
Figure 11B:
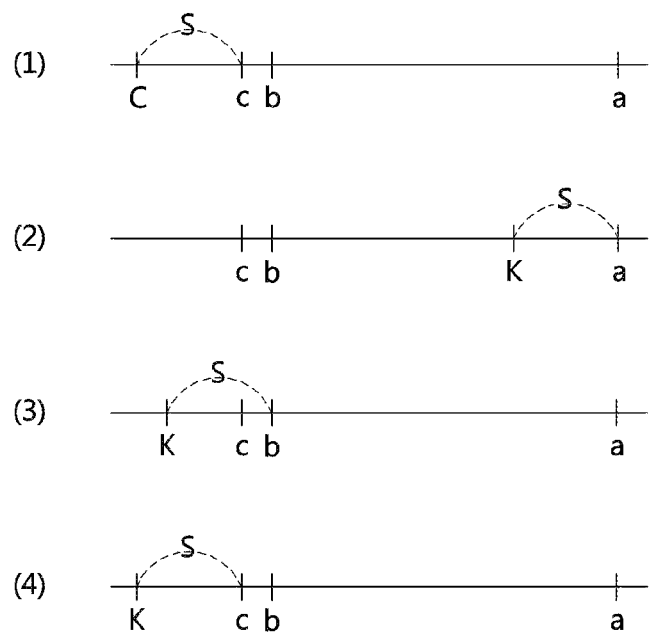

FIGS. 11A and 11B are conceptual views illustrating a method of determining a final prediction value in a decoding method according to an embodiment of the present invention.

Referring to FIGS. 7 and 11, a decoding method according to an embodiment of the present invention may utilize pixel values of neighbor pixels a, b, and c positioned in the left side, left upper side, and the upper side of the current pixel C. Here, for convenience of description, the pixel values of pixel a, pixel b, and pixel c are indicated as a, b, and c, respectively.

Referring to (1) of FIG. 11A, it can be seen that the pixel value of the neighbor pixel a positioned in the left side of the current pixel C among neighbor pixels a, b, an c positioned in the left side, the left upper side, and the upper side of the current pixel C is closest to the pixel value of the current pixel C. Accordingly, the pixel value of pixel a may be the final prediction value, and a difference S between the pixel value of the current pixel C and the pixel value of pixel a may be a residual value S for the current pixel C.

The encoding apparatus 100 according to an embodiment of the present invention may transmit the residual value S for the current pixel C first, and then transmit a code word indicating pixel a. In this case, since the decoding apparatus 200 may logically determine the candidate prediction values according to the residual value S for the current pixel C, a fewer or no flag values may be transmitted to the decoding apparatus 200.

Specifically, the decoding apparatus 200 according to an embodiment of the present invention may determine pixel a as the final prediction value even when the decoding apparatus 200 does not receive information indicating that pixel a is the final prediction value from the encoding apparatus 100. That is, it is assumed that the decoding apparatus 200 is aware only of the residual value S for the current pixel C and information indicating that pixel a, pixel b, and pixel c are the candidate prediction values. Here, a value obtained by adding the residual value S for the current pixel C to the candidate prediction value may be represented as K.

As shown in (2) of FIG. 11A, when it is assumed that pixel a is the final prediction value, K is a+S, and K is closest to pixel a. In this case, pixel a is not excluded from the candidate prediction values.

As shown in (3) of FIG. 11A, when it is assumed that pixel b is the final prediction value, K is b+S, and K is closest to pixel a. In this case, pixel b may be excluded from the candidate prediction values.

As shown in (4) of FIG. 11A, when it is assumed that pixel c is the final prediction value, K is c+S, and K is closest to pixel a. In this case, pixel c may also be excluded from the candidate prediction values.

Accordingly, when the pixel value C of the current pixel, the pixel value a of pixel a, the pixel value b of the pixel b, and the pixel value c of pixel c are as shown in (1) of FIG. 11A, the decoding apparatus 200 may determine the final prediction value using only the residual value S for the current pixel C. That is, the decoding apparatus 200 may determine the final prediction value using only pixel a as the candidate prediction value.

Referring to (1) of FIG. 11B, it can be seen that the pixel value of the neighbor pixel c positioned in the upper side of the current pixel C among neighbor pixels a, b, an c positioned in the left side, the left upper side, and the upper side of the current pixel C is closest to the pixel value of the current pixel C. Accordingly, the pixel value of pixel c may be the final prediction value, and a difference S between the pixel value of the current pixel C and the pixel value of pixel c may be the residual value S for the current pixel C.

The encoding apparatus 100 according to an embodiment of the present invention may transmit the residual value S for the current pixel C first, and then transmit a code word indicating pixel c. In this case, since the decoding apparatus 200 may logically determine the candidate prediction values according to the residual value S for the current pixel C, a fewer or no flag values may be transmitted to the decoding apparatus 200.

It is assumed that the decoding apparatus 200 is aware only of the residual value S for the current pixel C and information indicating that pixel a, pixel b, and pixel c are the candidate prediction values. Here, a value obtained by adding the residual value S for the current pixel C to the candidate prediction value may be represented as K.

As shown in (2) of FIG. 11B, when it is assumed that pixel a is the final prediction value, K is a+S, and pixel a is closest to K. In this case, pixel a is not excluded from the candidate prediction values.

As shown in (3) of FIG. 11B, when it is assumed that pixel b is the final prediction value, K is b+S, and K is closest to pixel c. In this case, pixel b may be excluded from the candidate prediction values.

As shown in (4) of FIG. 11B, when it is assumed that pixel c is the final prediction value, K is c+S, and K is closest to pixel c. In this case, pixel c is not excluded from the candidate prediction values.

Specifically, since pixel a and pixel c other than pixel b among the three candidate prediction values are logically true, the final prediction value may be determined using a pixel value of any one of the two pixels.

Accordingly, only information regarding candidate prediction values to be used to determine the final prediction value between pixel a and pixel c may be transmitted to the decoding apparatus 200.

That is, referring to FIG. 9B, although a code word of 11, which is information regarding pixel c based on three cases that are caused by utilizing three candidate prediction values, should be utilized, a code word based on two cases may be utilized in a case as shown in (1) of FIG. 11B. For example, pixel a may utilize a code word of 0, and pixel c may utilize a cod word of 1.

Accordingly, it is possible to enhance encoding performance by reducing the transmitted code word through verification of a logical error.

Referring again to FIG. 17, a video encoding apparatus that performs an intra-prediction method according to an embodiment of the present invention includes a subtractor 110, an entropy encoding unit 120, an adder 130, an inter-prediction unit 140, and an intra-prediction unit 150.

For a lossy encoding apparatus, entropy-encoding is performed after transformation and quantization. However, for a lossless encoding apparatus, the entropy-encoding is performed directly. When an input image is entered, a residual value obtained by inter-predicting or intra-predicting the input image may be transmitted to the entropy encoding unit. However, the encoding apparatus 100 according to an embodiment of the present invention is not limited to the lossless encoding apparatus.

The intra-prediction unit 150 according to an embodiment of the present invention may generate a prediction value of the current pixel C according to an intra-prediction mode and may generate at least one candidate prediction value based on neighbor pixel adjacent to the current pixel C.

In addition, the intra-prediction unit 150 may determine the final prediction value between the prediction value of the current pixel C and at least one candidate prediction value.

In particular, when the intra-prediction mode is a DC mode, the intra-prediction unit 150 may generate at least one candidate prediction value based on neighbor pixels adjacent to the current pixel C. Here, the neighbor pixels may be positioned in the left side, the left upper side, the upper side, and the right upper side of the current pixel C.

The subtractor 110 may generate a residual value using the difference between the final prediction value and the pixel value of the current pixel C.

Accordingly, the encoding apparatus 100 according to an embodiment of the present invention may determine the final prediction value by comparing the prediction value of the current pixel C and the difference between the at least one candidate prediction value and the pixel value of the current pixel C.

In addition, the encoding apparatus 100 may generate a bit stream by adding a flag value including information regarding at least one candidate prediction value to a residual value.

Except for this, the lossless encoding apparatus is similar to the lossy encoding apparatus, and thus will be simply described. The entropy encoding unit 120 may perform entropy-encoding on a residual image, the adder 130 may add the residual image and the prediction image to generate a reconstructed image, and the inter-prediction unit 140 may perform intra-prediction through motion estimation.

Referring again to FIG. 18, the decoding apparatus 200 according to an embodiment of the present invention includes an entropy decoding unit 210, an adder 220, an intra-prediction unit 230, and an inter-prediction unit 240.

For a lossy decoding apparatus, inverse quantization and inverse transformation are performed after entropy-decoding. However, for a lossless decoding apparatus, the inverse quantization and inverse transformation may not be performed. That is, the residual value for the current pixel C is obtained by decoding the bit stream, and the reconstructed image may be generated by adding the final prediction value to the residual value for the current pixel C. However, the decoding apparatus 200 according to an embodiment of the present invention is not limited to the lossless decoding apparatus.

The entropy-decoding unit 210 may decode the received bit stream to generate reconstructed information including the intra-prediction information and the residual value for the current pixel C.

The intra-prediction unit 230 may determine the final prediction value on the basis of values obtained by adding the residual value for the current pixel C to the prediction value of the current pixel C according to the intra-prediction mode based on the intra-prediction information and the at least one candidate prediction value based on neighbor pixels adjacent to the current pixel C.

That is, the intra-prediction unit 230 may determine the final prediction value by comparing the pixel value of the current pixel C with values obtained by adding the residual value for the current pixel C to the prediction value of the current pixel C and the at least one candidate prediction value. Here, the candidate prediction value may be based on pixel values of the neighbor pixels a, b, c, and d positioned in a left side, a left upper side, an upper side, and a right upper side of the current pixel C.

In addition, the intra-prediction information may include information regarding the positions and number of neighbor pixels adjacent to the current pixel C.

Except for this, the lossless decoding apparatus is similar to the lossless encoding apparatus, and thus a detailed description thereof will not be provided.

The intra-prediction method and apparatus using an additional prediction candidate according to the above-describe embodiment of the present invention may enhance accuracy of the intra-prediction by using an additional prediction candidate.

In addition, it is possible to enhance the encoding efficiency by enhancing accuracy of the intra-prediction and thus reducing a residual component.

Intra-Prediction with Improved Planar Mode

Figure 12:
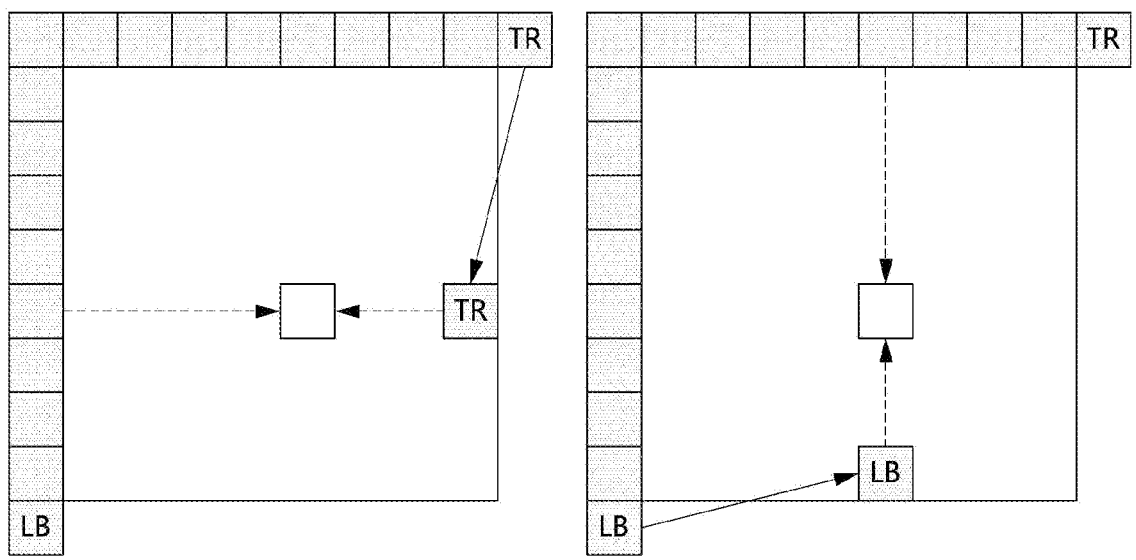
FIG. 12 is a conceptual view illustrating a planar mode according to HEVC standard.

FIG. 12 is a conceptual view illustrating a planar mode according to HEVC standard.

According to the planar mode with reference to FIG. 12, first, a first prediction value may be obtained using a pixel TR positioned in a upper right corner of the current block and a pixel positioned in the same horizontal line as the current pixel and adjacent to the current block. In addition, a second prediction value may be obtained using a pixel LB positioned in a lower left corner of the current block and a pixel positioned in the same vertical line as the current pixel and adjacent to the current block. In addition, an average value of the first prediction value and the second prediction value may be determined as a prediction value of the current pixel.

In FIG. 12, a pixel corresponding to a dark area may denote a pixel adjacent to the current block. That is, the current block may be indicated as a block with a size of 8×8 in a bright region. However, the size of the current block is not limited to 8×8. Accordingly, the current pixel may be included in the current block and denote a pixel to be encoded/decoded.

In the planar mode, when the current pixel is far from the pixel TR positioned in the upper right corner of the current block and the pixel positioned in the same horizontal line as the current pixel and adjacent to the current block and far from the pixel LB positioned in the lower left corner of the current block and the pixel positioned in the same vertical line as the current pixel and adjacent to the current block, the prediction accuracy may be reduced.

Figure 13:
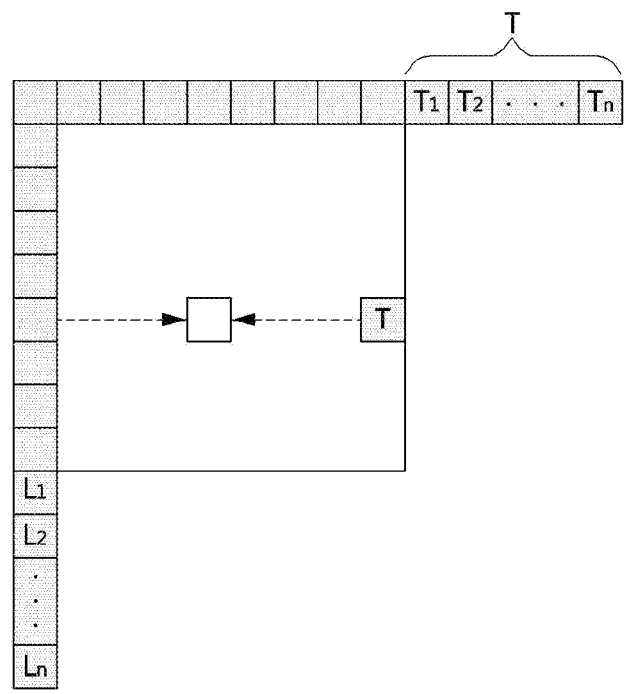
FIG. 13 is a conceptual view illustrating intra-prediction according to an embodiment of the present invention.
Figure 13:
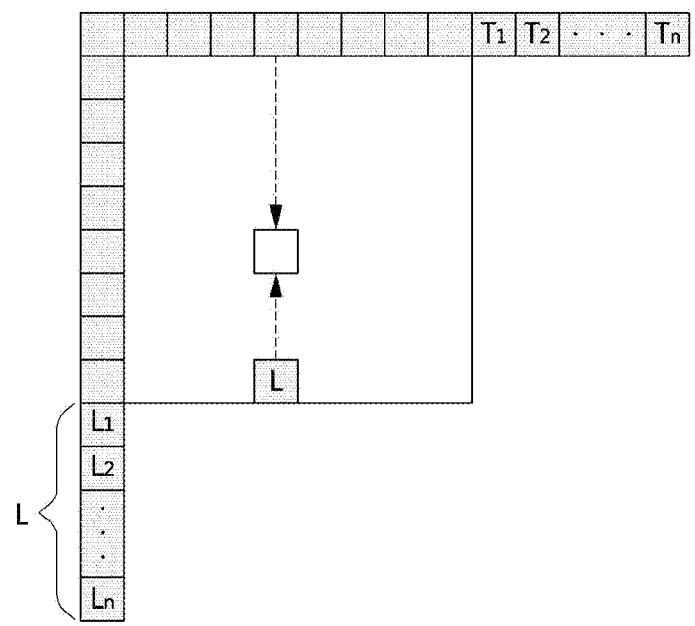

FIG. 13 is a conceptual view illustrating intra-prediction according to an embodiment of the present invention.

The planar mode according to HEVC uses, as reference pixels, the pixel TR positioned in the upper right corner of the current block and the pixel LB positioned in the lower left corner of the current block, which are shown in FIG. 12.

On the contrary, referring to FIG. 13, the planar mode modified according to an embodiment of the present invention may use, as reference pixels, pixels selected from among pixels positioned in the same horizontal line as the pixel TR positioned in the upper right corner of the current block. In addition, a pixel generated by filtering the pixels positioned in the same horizontal line as the pixel TR positioned in the upper right corner of the current block may be used as reference pixels. For example, in FIG. 13, one of pixels positioned in T1 to Tn may be determined as a reference pixel, or a pixel generated by filtering T1 to Tn may be determined as a reference pixel.

Here, a pixel selected from among pixels positioned in the same horizontal line as the pixel TR in the upper right corner of the current pixel or a pixel generated by filtering pixels positioned in the same horizontal line as the pixel TR of the right upper side of the current pixel may be defined as a pixel T of a right upper side of the current pixel. Furthermore, the pixel T in the upper right corner of the current pixel may conceptually include the pixel TR in the upper right corner of the current pixel.

Meanwhile, the planar mode modified according to an embodiment of the present invention may use a pixel selected from among pixels positioned in the same vertical line as the pixel LB in the lower left corner of the current pixel. In addition, a pixel generated by filtering the pixels positioned in the same vertical line as the pixel TR in the lower left corner of the current block may be used as a reference pixel. For example, in FIG. 13, one of pixels positioned in L1 to Ln may be determined as a reference pixel, or a pixel generated by filtering L1 to Ln may be determined as a reference pixel.

Here, a pixel selected from among pixels positioned in the same vertical line as the pixel LB in the lower left corner of the current pixel or a pixel generated by filtering pixels positioned in the same vertical line as the pixel LB of the left lower side of the current pixel may be defined as a pixel T of a upper right corner of the current pixel. Furthermore, the pixel L in the lower left corner of the current pixel may conceptually include the pixel L in the lower left corner of the current pixel.

Accordingly, embodiments will be described below using concepts of the pixel T in the upper right corner of the current pixel and the pixel L in the lower left corner of the current pixel.

Figure 14A:
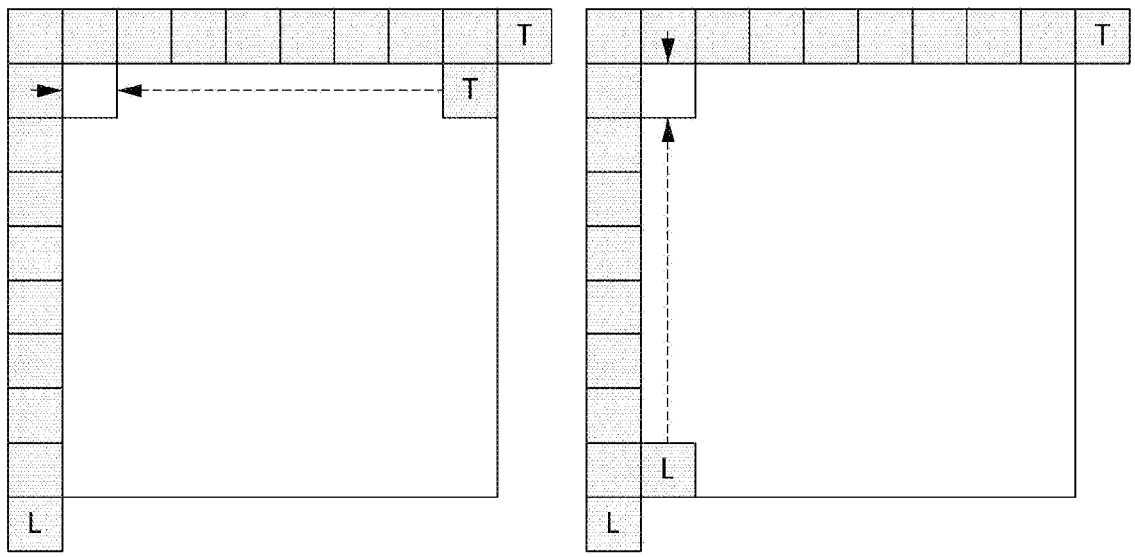
FIG. 14A to 14C are conceptual views illustrating intra-prediction according to another embodiment of the present invention.
Figure 14B:
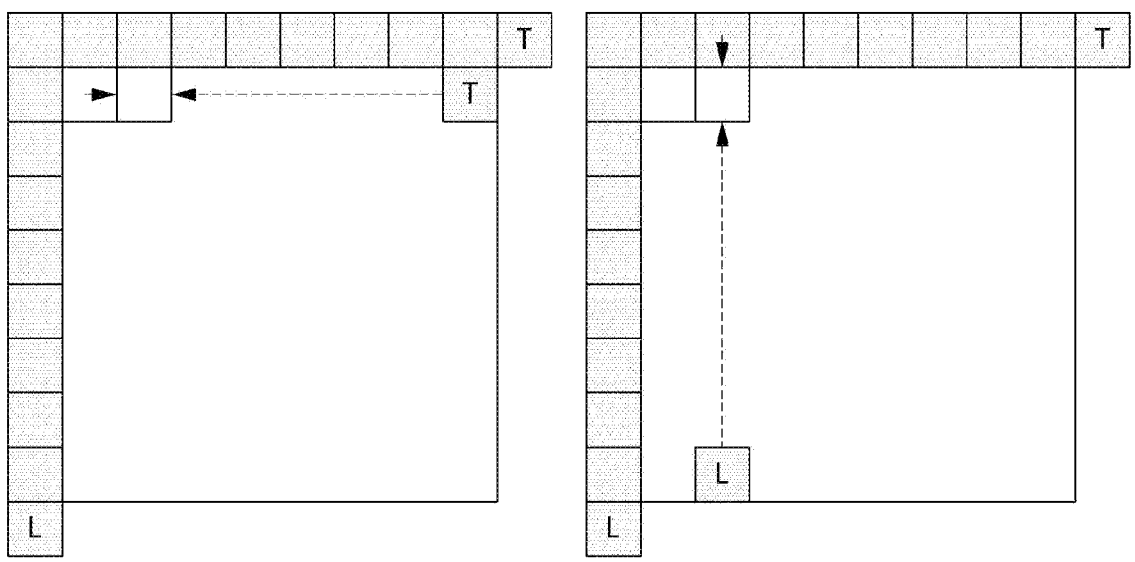
Figure 14C:
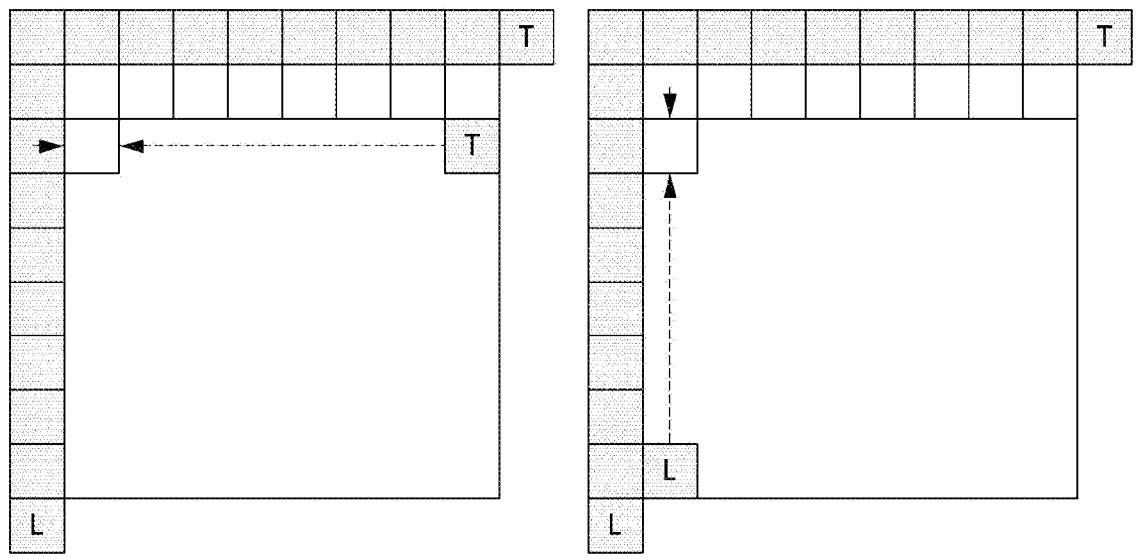
Figure 15A:
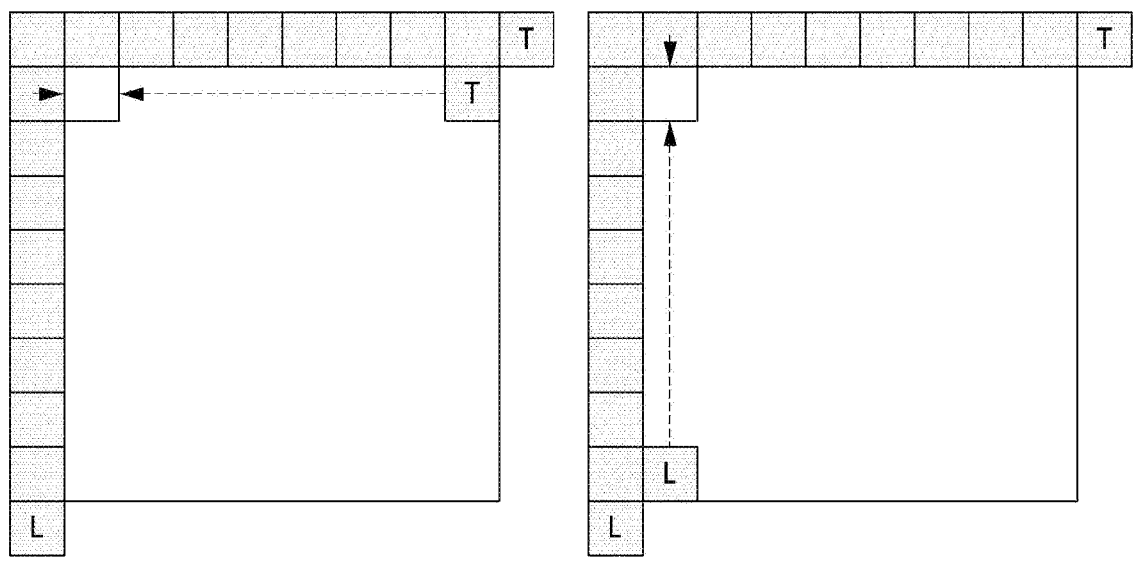
FIGS. 15A to 15C is conceptual views illustrating intra-prediction according to still another embodiment of the present invention.
Figure 15B:
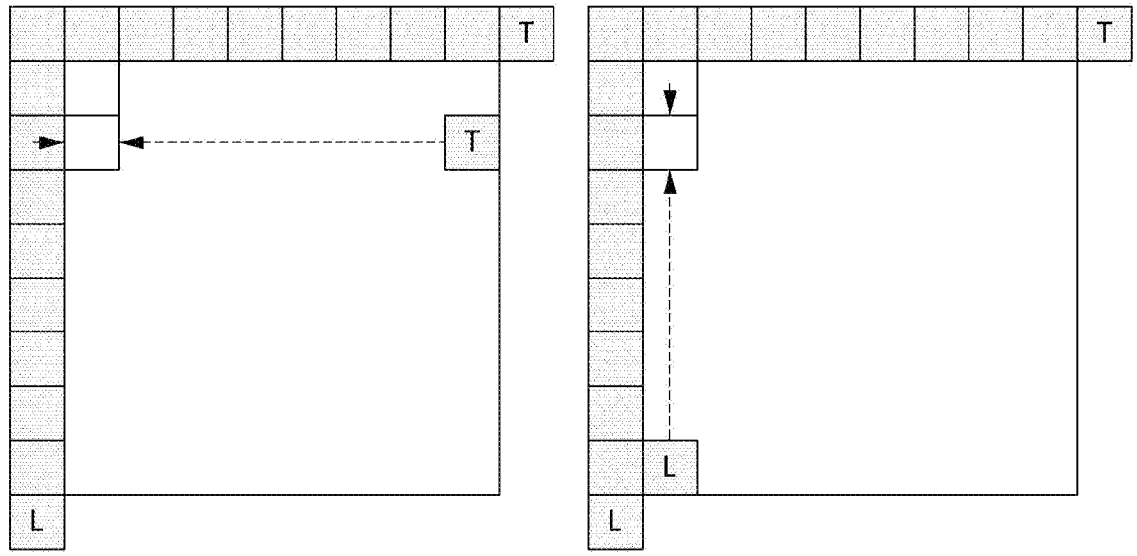
Figure 15C:
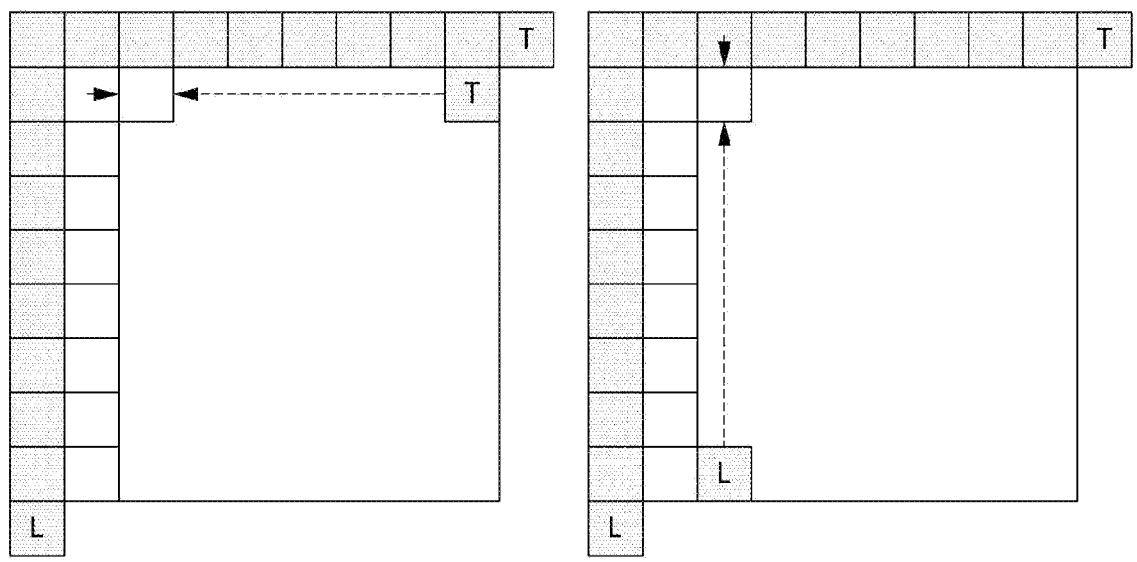

FIGS. 14A to 14C are conceptual views illustrating intra-prediction according to another embodiment of the present invention, and FIGS. 15A to 15C are conceptual views illustrating intra-prediction according to still another embodiment of the present invention. In FIGS. 14 and 15, the current block may be indicated as a block with a size of 8×8 in a bright region. However, the size of the current block is not limited to 8×8.

An intra-prediction according to a planar mode modified according to an embodiment of the present invention will be described with reference to FIGS. 14 and 15. A first prediction value may be generated using the pixel T positioned in the upper right corner of the current block and a first reference pixel positioned in the same horizontal line as the current pixel and adjacent to the current block. In addition, a second prediction value may be generated using the pixel L positioned in the left lower side of the current block and a second reference pixel positioned in the same vertical line as the current pixel and adjacent to the current block. For example, the first prediction value may be generated by performing interpolation using the pixel T in the upper right corner and the first reference pixel, and the second prediction value may be generated by performing interpolation using the pixel L in the lower left corner and the second reference pixel.

A final prediction value for the current pixel may be generated using the first prediction value and the second prediction value. For example, the final prediction value may be generated by averaging the first prediction value and the second prediction value.

First, referring to FIG. 14A, the intra-prediction may be performed on the current pixel positioned at the upper left corner of the current block. That is, the intra-prediction may be performed beginning with the current pixel positioned at the upper left corner of the current block.

Here, the intra-prediction may be performed on the current block that is included in the current block and is a start point of the intra-prediction in the same method as the existing planar mode. That is, the first reference pixel and the second reference pixel may be pixels included in a block adjacent to the current block.

Referring to FIGS. 14B and 14C, the intra-prediction may be sequentially performed in the horizontal direction. For example, after the intra-prediction of the current pixel included in a top row of the current block is completed, the intra-prediction may be performed on a next row (downward). That is, the intra-prediction may be performed in a raster scan order.

Next, referring to FIG. 15A, the intra-prediction may be performed on the current pixel positioned the upper left corner of the current block. That is, the intra-prediction may be performed beginning with the current pixel positioned at the upper left corner of the current block.

Here, the intra-prediction may be performed on the current block that is included in the current block and is a start point of the intra-prediction in the same method as the existing planar mode. That is, the first reference pixel and the second reference pixel may be pixels included in a block adjacent to the current block.

Referring to FIGS. 15B and 15C, the intra-prediction may be sequentially performed in the vertical direction. For example, after intra-prediction of the current pixel included in a leftmost column of the current block is completed, the intra-prediction may be performed on a next column (rightward).

Although the case in which the intra-prediction is performed beginning with the current pixel positioned at the upper left corner of the current block has been described with reference to embodiments of FIGS. 14 and 15, the intra-prediction may be performed beginning with the current pixel that is positioned at another position. Furthermore, although an embodiment in which the intra-prediction may be sequentially performed in the horizontal or vertical direction has been described, the inter-prediction may be sequentially performed in a diagonal direction. Here, the diagonal direction may denote a diagonal up-right direction.

According to an embodiment of the present invention, it is possible to enhance accuracy of the intra-prediction by utilizing, as reference pixels, a pixel positioned in the same horizontal line as the current pixel and adjacent to the current block and a pixel positioned in the same vertical line as the current pixel and adjacent to the current block.

Figure 16:
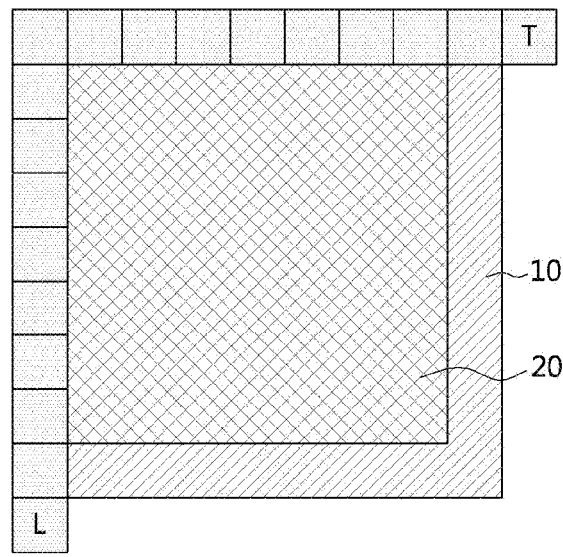
FIG. 16 is a conceptual view illustrating intra-prediction according to still another embodiment of the present invention.

FIG. 16 is a conceptual view illustrating intra-prediction according to still another embodiment of the present invention.

Referring to FIG. 16, the current block may be partitioned into at least two regions, and then the planar mode may be performed. That is, the inter-prediction may be performed on a first region 10 and then a second region 20. Since a pixel positioned in the first region on which the intra-prediction has been performed may be used as a reference pixel, the accuracy of the intra-prediction may be further enhanced.

For example, the intra-prediction is performed on the bottom row and the rightmost column of the current block first, and then the intra-prediction may be performed on the remaining region 20.

In this case, the intra-prediction may be performed beginning with the current pixel positioned at another position, instead of the current pixel positioned at the upper left corner of the current block. For example, the intra-prediction may be performed beginning with the current pixel positioned at the lower right corner of the current block.

Accordingly, in an embodiment of the present invention, it is possible to enhance the accuracy of the intra-prediction by partitioning the current block as shown in FIG. 6 and sequentially performing intra-prediction. However, the present invention may partition the current block into various regions and sequentially perform intra-prediction. The present invention is limited to the partition as shown in FIG. 16.

The intra-prediction according to the planar mode of FIG. 12 may be represented by Equation (1) below:

$$predSamples[x][y]=((nTbS-1-x) \times p[-1][y]+(x+1) \times p[nTbS][-1]+(nTbS\ 1-y) \times p[x][-1]+(y+1) \times p[-1][nTbS]) >>> (\log 2(nTbS)+1)$$ [Equation 1]

where x and y indicate coordinate values of a pixel, nTbS indicates a size of the block, p[x][y] indicates a pixel value of a pixel positioned at a coordinate (x, y), and predSamples [x][y] indicates a predicted pixel value.

According an embodiment of the present invention, a first prediction value may be generated by applying weights to the pixel TR at the upper right corner of the current block and the pixel positioned in the same horizontal line as the current pixel and adjacent to the current block. In addition, a second prediction value may be generated by applying weights to the pixel LB at the lower left corner of the current block and the pixel positioned in the same vertical line as the current pixel and adjacent to the current block.

A final prediction value for the current pixel may be generated using the first prediction value and the second prediction value. For example, the final prediction value may be generated by averaging the first prediction value and the second prediction value.

That is, according to an embodiment of the present invention, the weights may be applied to the pixel TR at the upper right corner of the current block, the pixel positioned in the same horizontal line as the current pixel and adjacent to the current block, the pixel LB at the lower left corner of the current block, and the pixel positioned in the same vertical line as the current pixel and adjacent to the current block. Here, the weights applied to the respective pixels may be the same as or different from one another.

In addition, each weight may be determined based on a direction of the current block, and the direction of the current block may be divided into a horizontal direction and a vertical direction.

For example, in order to find an optimal mode for the inter-prediction of the current block, the direction of the current block may be checked when the prediction is performed. In this case, when the prediction is performed using the planar mode, a prediction value may be generated by assigning an appropriate weight according to a previously found direction pattern of the current block.

However, the direction of the current block is not limited to the horizontal direction and the vertical direction.

The planar mode modified by applying a weight to a reference pixel according to an embodiment of the present invention may be represented by Equation (2) below:

$$predSamples[x][y]=(\omega_A \times (nTbS-1-x) \times p[-1][y]+\omega_B \times (x+1) \times p[nTbS][-1]+\omega_C \times (nTbS-1-y) \times p[x][-1]+\omega_D \times (y+1) \times p[-1][nTbS]+nTbS) >> (\log 2(nTbS)+1)$$ [Equation 2]

where $\omega_A$, $\omega_B$, $\omega_C$, and $\omega_D$ may indicate weights. Accordingly, $\omega_A$, $\omega_B$, $\omega_C$, and $\omega_D$ may be determined based on the direction of the current block. For example, when the current block has the horizontal direction, $\omega_A$ and $\omega_B$ may be greater than $\omega_C$ and $\omega_D$. In addition, when the current block has the horizontal direction, $\omega_A$ and $\omega_B$ may be less than $\omega_C$ and $\omega_D$.

Meanwhile, the weights can be set by the encoding apparatus and set in various units. That is, the weights can be assigned in various manners, for example, differently for each block or identically for the same picture. Information on the weights may be set under agreement between the encoding apparatus and the decoding apparatus. In addition, the encoding apparatus may send the information on the weights to the decoding apparatus in units of a sequence, picture, block, or the like.

Referring again to FIG. 17, a video encoding apparatus that performs an intra-prediction method according to an embodiment of the present invention includes a subtractor 110, an entropy encoding unit 120, an adder 130, an inter-prediction unit 140, and an intra-prediction unit 150.

For a lossy encoding apparatus, entropy-encoding is performed after transformation and quantization. However, for a lossless encoding apparatus, the entropy-encoding is performed directly. When an input image is entered, a residual value obtained by inter-predicting or intra-predicting the input image may be transmitted to the entropy encoding unit. However, the encoding apparatus 100 according to an embodiment of the present invention is not limited to the lossless encoding apparatus.

The intra-prediction unit 150 according to an embodiment of the present invention may generate the first prediction value using the pixel T at the upper right corner of the current block and the first reference pixel. In addition, the intra-prediction unit 150 may generate the second prediction value using the pixel L at the lower left corner of the current block and the second reference pixel. Here, the first reference pixel is a pixel positioned in the same horizontal line as the current pixel and adjacent to the current block, and the second reference pixel is a pixel positioned in the same vertical line as the current pixel and adjacent to the current block.

Here, the pixel T at the upper right corner of the current block may be any one of the pixel TR at the upper right corner of the current pixel, a pixel selected from among pixels positioned in the same horizontal line as the pixel TR at the upper right corner of the current pixel, and a pixel generate by filtering the pixels positioned in the same horizontal line as the pixel TR at the upper right corner of the current pixel.

In addition, the pixel L at the lower left corner of the current block may be any one of the pixel LB at the lower left corner of the current pixel, a pixel selected from among pixels positioned in the same vertical line as the pixel LB at the lower left corner of the current pixel, and a pixel generate by filtering the pixels positioned in the same vertical line as the pixel LB at the lower left corner of the current pixel.

The intra-prediction unit 150 may partition the current block into two regions and sequentially perform the intra-prediction on each partitioned region.

Furthermore, the intra-prediction unit 150 may generate the first prediction value by applying weights to the pixel TR at the upper right corner of the current block and the pixel positioned in the same horizontal line as the current pixel and adjacent to the current block. In addition, the intra-prediction unit 150 may generate a second prediction value by applying weights to the pixel LB at the lower left corner of the current block and the pixel positioned in the same vertical line as the current pixel and adjacent to the current block.

Here, each weight may be determined based on a direction of the current block, and the direction of the current block may be divided into a horizontal direction and a vertical direction.

As a result, the intra-prediction unit 150 may generate a final prediction value for the current pixel using the first prediction value and the second prediction value. For example, the final prediction value may be generated by averaging the first prediction value and the second prediction value.

The subtractor 110 may generate a residual value using a difference between the final prediction value and the pixel value of the current pixel.

In addition, the encoding apparatus 100 may send information on the weights to the decoding apparatus in units of a sequence, picture, block, or the like.

Except for this, the lossless encoding apparatus is similar to the lossy encoding apparatus, and thus will be simply described. The entropy encoding unit 120 may perform entropy-encoding on a residual image, the adder 130 may add the residual image and the prediction image to generate a reconstructed image, and the inter-prediction unit 140 may perform intra-prediction through motion estimation.

Referring again to FIG. 18, the decoding apparatus according to an embodiment of the present invention includes an entropy decoding unit 210, an adder 220, an intra-prediction unit 230, and an inter-prediction unit 240.

For a lossy decoding apparatus, inverse quantization and inverse transformation are performed after entropy-decoding. However, for a lossless decoding apparatus, the inverse quantization and inverse transformation may not be performed. That is, the residual value for the current pixel is obtained by decoding the bit stream, and the reconstructed image may be generated by adding the final prediction value to the residual value for the current pixel. However, the decoding apparatus according to an embodiment of the present invention is not limited to the lossless decoding apparatus.

The entropy-decoding unit 210 may decode the received bit stream to generate reconstructed information including the intra-prediction information and the residual value for the current pixel. Here, the intra-prediction information may include information regarding the planar mode that is modified according to an embodiment of the present invention.

The intra-prediction unit 230 may generate a first prediction value using the pixel T at the upper right corner of the current block including the current block and the first reference pixel based on the intra-prediction information. In addition, the intra-prediction unit 230 may generate a second prediction value using the pixel L at the lower left corner of the current block including the current block and the second reference pixel based on the intra-prediction information.

Here, the pixel T at the upper right corner of the current block may be any one of the pixel TR at the upper right corner of the current pixel, a pixel selected from among pixels positioned in the same horizontal line as the pixel TR at the upper right corner of the current pixel, and a pixel generate by filtering the pixels positioned in the same horizontal line as the pixel TR at the upper right corner of the current pixel.

In addition, the pixel L at the lower left corner of the current block may be any one of the pixel LB at the lower left corner of the current pixel, a pixel selected from among pixels positioned in the same vertical line as the pixel LB at the lower left corner of the current pixel, and a pixel generate by filtering the pixels positioned in the same vertical line as the pixel LB at the lower left corner of the current pixel.

The intra-prediction unit 230 may partition the current block into two regions and sequentially perform the intra-prediction on each partitioned region.

Here, the first reference pixel is a pixel positioned in the same horizontal line as the current pixel and adjacent to the current block, and the second reference pixel is a pixel positioned in the same vertical line as the current pixel and adjacent to the current block.

Furthermore, the intra-prediction unit 230 may generate the first prediction value by applying weights to the pixel TR at the upper right corner of the current block and the pixel positioned in the same horizontal line as the current pixel and adjacent to the current block. In addition, the intra-prediction unit 230 may generate a second prediction value by applying weights to the pixel LB at the lower left corner of the current block and the pixel positioned in the same vertical line as the current pixel and adjacent to the current block.

Here, each weight may be determined based on a direction of the current block, and the direction of the current block may be divided into a horizontal direction and a vertical direction.

As a result, the intra-prediction unit 230 may generate a final prediction value for the current pixel using the first prediction value and the second prediction value. For example, the final prediction value may be generated by averaging the first prediction value and the second prediction value.

In addition, the adder 220 may add the residual image and the prediction image to generate a reconstructed image. That is, the adder 220 may add the residual value for the current pixel to the final prediction value to generate the reconstructed image.

The inter-prediction unit 240 may perform inter-prediction through motion prediction.

Except for this, the lossless decoding apparatus is similar to the lossless encoding apparatus, and thus a detailed description thereof will not be provided.

An apparatus and method for encoding and decoding a video using the intra-prediction according to an embodiment of the present invention can enhance accuracy of the intra-prediction by performing the intra-prediction using a reference pixel having high correlation.

In addition, the accuracy of the intra-prediction may be enhanced by applying a weight that is based on a direction of the current block when the planar mode is applied.

Accordingly, it is possible to enhance the encoding/decoding efficiency by enhancing accuracy of the intra-prediction.

While the example embodiments of the present invention and their advantages have been described in detail, it should be understood that various changes, substitutions, and alterations may be made herein without departing from the scope of the invention.

What is claimed is:

1. An image decoding method, which is performed by an image decoding apparatus, the method comprising:
   dividing a current block into two regions including a first region and a second region, a current pixel belonging to the first region;
   performing intra prediction on the first region of the current block; and
   performing intra prediction on the second region of the current block based on the first region in which the intra prediction on the first region is completed,
   wherein performing the intra prediction on the first region of the current block comprises:
   obtaining a first neighboring pixel of the first region belonging to the same horizontal line as the current pixel belonging to the first region;
   obtaining a second neighboring pixel of the first region belonging to the same vertical line as the current pixel belonging to the first region; and
   generating a prediction value of the current pixel by applying weights to the first neighboring pixel and the second neighboring pixel, and
   wherein the prediction value of the current pixel is generated by using a pixel T belonging to a block adjacent to an upper right corner of the first region and a pixel L belonging to a block adjacent to a lower left corner of the first region, and
   wherein an intra prediction mode of the current block is determined based on intra prediction information decoded from a bitstream.

2. The method of claim 1,
   wherein the weights include a first weight applied to a first reference pixel and a second weight applied to a second reference pixel.

3. The method of claim 2,
   wherein the weights are determined based on at least one of a direction of the current block or a position of the current pixel.

4. The method of claim 3,
   wherein in response to the direction of the current block being a horizontal direction, the first weight applied to the first reference pixel is smaller than the second weight applied to the second reference pixel.

5. An image encoding method, which is performed by an image encoding apparatus, the method comprising:
   dividing a current block into two regions including a first region and a second region, a current pixel belonging to the first region;
   performing intra prediction on the first region of the current block; and
   performing intra prediction on the second region of the current block based on the first region in which the intra prediction on the first region is completed,
   wherein performing the intra prediction on the first region of the current block comprises:
   obtaining a first neighboring pixel of the first region belonging to the same horizontal line as the current pixel belonging to the first region;
   obtaining a second neighboring pixel of the first region belonging to the same vertical line as the current pixel belonging to the first region; and
   generating a prediction value of the current pixel by applying weights to the first neighboring pixel and the second neighboring pixel, and
   wherein the prediction value of the current pixel is generated by using a pixel T belonging to a block adjacent to an upper right corner of the first region and a pixel L belonging to a block adjacent to a lower left corner of the first region, and
   wherein intra prediction information related to an intra prediction mode of the current block is encoded into a bitstream.

6. The method of claim 5,
   wherein the weights include a first weight applied to a first reference pixel and a second weight applied to a second reference pixel.

7. The method of claim 6,
   wherein the weights are determined based on at least one of a direction of the current block or a position of the current pixel.

8. The method of claim 7,
   wherein in response to the direction of the current block being a horizontal direction, the first weight applied to the first reference pixel is smaller than the second weight applied to the second reference pixel.

9. A method of transmitting comprising:
   dividing a current block into two regions including a first region and a second region, a current pixel belonging to the first region;
   performing intra prediction on the first region of the current block;
   performing intra prediction on the second region of the current block based on the first region in which the intra prediction on the first region is completed; and
   transmitting a bitstream generated based on the intra prediction,
   wherein performing the intra prediction on the first region of the current block comprises:
   obtaining a first neighboring pixel of the first region belonging to the same horizontal line as the current pixel belonging to the first region;
   obtaining a second neighboring pixel of the first region belonging to the same vertical line as the current pixel belonging to the first region; and
   generating a prediction value of the current pixel by applying weights to the first neighboring pixel and the second neighboring pixel, and
   wherein the prediction value of the current pixel is generated by using a pixel T belonging to a block adjacent to an upper right corner of the first region and a pixel L belonging to a block adjacent to a lower left corner of the first region, and
   wherein intra prediction information related to an intra prediction mode of the current block is encoded into the bitstream.

* * * * *